United States Patent
Honda et al.

(10) Patent No.: US 10,153,677 B2
(45) Date of Patent: Dec. 11, 2018

(54) STATOR AND ELECTRIC PUMP

(71) Applicant: Aisan Kogyo Kabushiki Kaisha, Obu-shi (JP)

(72) Inventors: Yoshihiko Honda, Obu (JP); Akira Hamajima, Obu (JP)

(73) Assignee: AISAN KOGYO KABUSHIKI KAISHA, Obu-Shi (JP)

( * ) Notice: Subject to any disclaimer, the term of this patent is extended or adjusted under 35 U.S.C. 154(b) by 419 days.

(21) Appl. No.: 14/997,759

(22) Filed: Jan. 18, 2016

(65) Prior Publication Data

US 2016/0211717 A1  Jul. 21, 2016

(30) Foreign Application Priority Data

Jan. 20, 2015 (JP) ................... 2015-008665

(51) Int. Cl.
| | |
|---|---|
| *H02K 1/00* | (2006.01) |
| *H02K 5/08* | (2006.01) |
| *F04D 5/00* | (2006.01) |
| *F04D 13/06* | (2006.01) |
| *H02K 1/14* | (2006.01) |
| *H02K 1/18* | (2006.01) |

(52) U.S. Cl.
CPC ............... *H02K 5/08* (2013.01); *F04D 5/002* (2013.01); *F04D 13/06* (2013.01); *F04D 13/0693* (2013.01); *H02K 1/148* (2013.01); *H02K 1/185* (2013.01)

(58) Field of Classification Search
CPC ...................................... H02K 1/148
USPC ........................................... 310/43
See application file for complete search history.

(56) References Cited

U.S. PATENT DOCUMENTS

| | | | | |
|---|---|---|---|---|
| 5,975,234 A | * | 11/1999 | Bugosh | B62D 5/0403 180/444 |
| 6,633,103 B2 | * | 10/2003 | Eggers | H02K 1/04 310/254.1 |
| 6,798,111 B1 | * | 9/2004 | Petersen | H02K 5/08 310/254.1 |
| 9,306,437 B2 | * | 4/2016 | Brandau | H02K 1/148 |
| 2013/0034455 A1 | | 2/2013 | Ikeya | |

(Continued)

FOREIGN PATENT DOCUMENTS

| | | |
|---|---|---|
| JP | 2001-231192 A | 8/2001 |
| JP | 2009-017746 A | 1/2009 |
| JP | 2012-180828 A | 9/2012 |

(Continued)

*Primary Examiner* — Alexander Talpalatski
(74) *Attorney, Agent, or Firm* — Shumaker, Loop & Kendrick, LLP

(57) ABSTRACT

A stator may include a stator yoke including one or more yoke portions extending along a circumferential direction of the stator yoke; and a cover configured of resin. The stator yoke may include: a contact part at which an end surface of one yoke portion among the one or more yoke portions in the circumferential direction contacts the other end surface of the one yoke portion in the circumferential direction; a first groove extending along an axial direction of the stator yoke in a vicinity of the contact part; and a second groove extending along the axial direction and disposed at a position spaced father away from the contact part than the first groove. The cover may include a filling that fills the first groove, and the second groove may be hollow.

9 Claims, 13 Drawing Sheets

(56) References Cited

U.S. PATENT DOCUMENTS

2013/0315760 A1    11/2013  Torii
2014/0300242 A1*   10/2014  Honda ................... H02K 1/148
                                                    310/216.009

FOREIGN PATENT DOCUMENTS

JP        2013-247692  A     12/2013
JP        2014-013029  A      1/2014

* cited by examiner

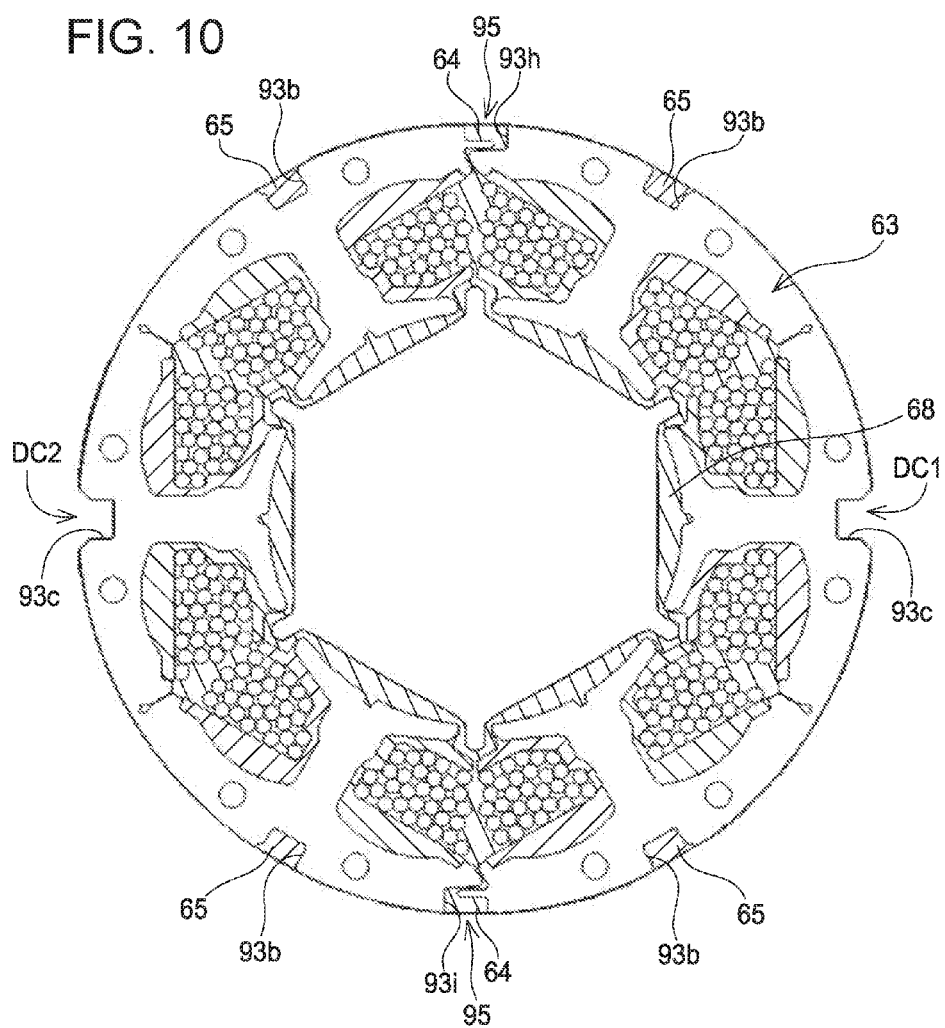

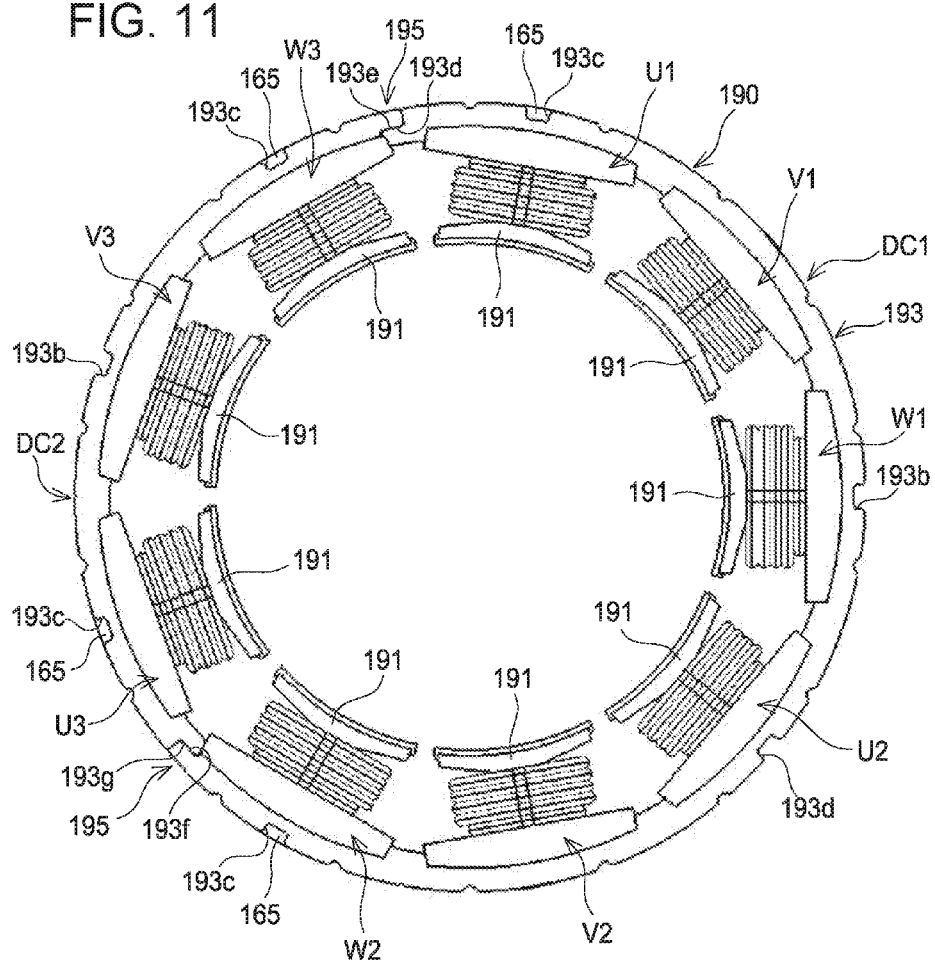

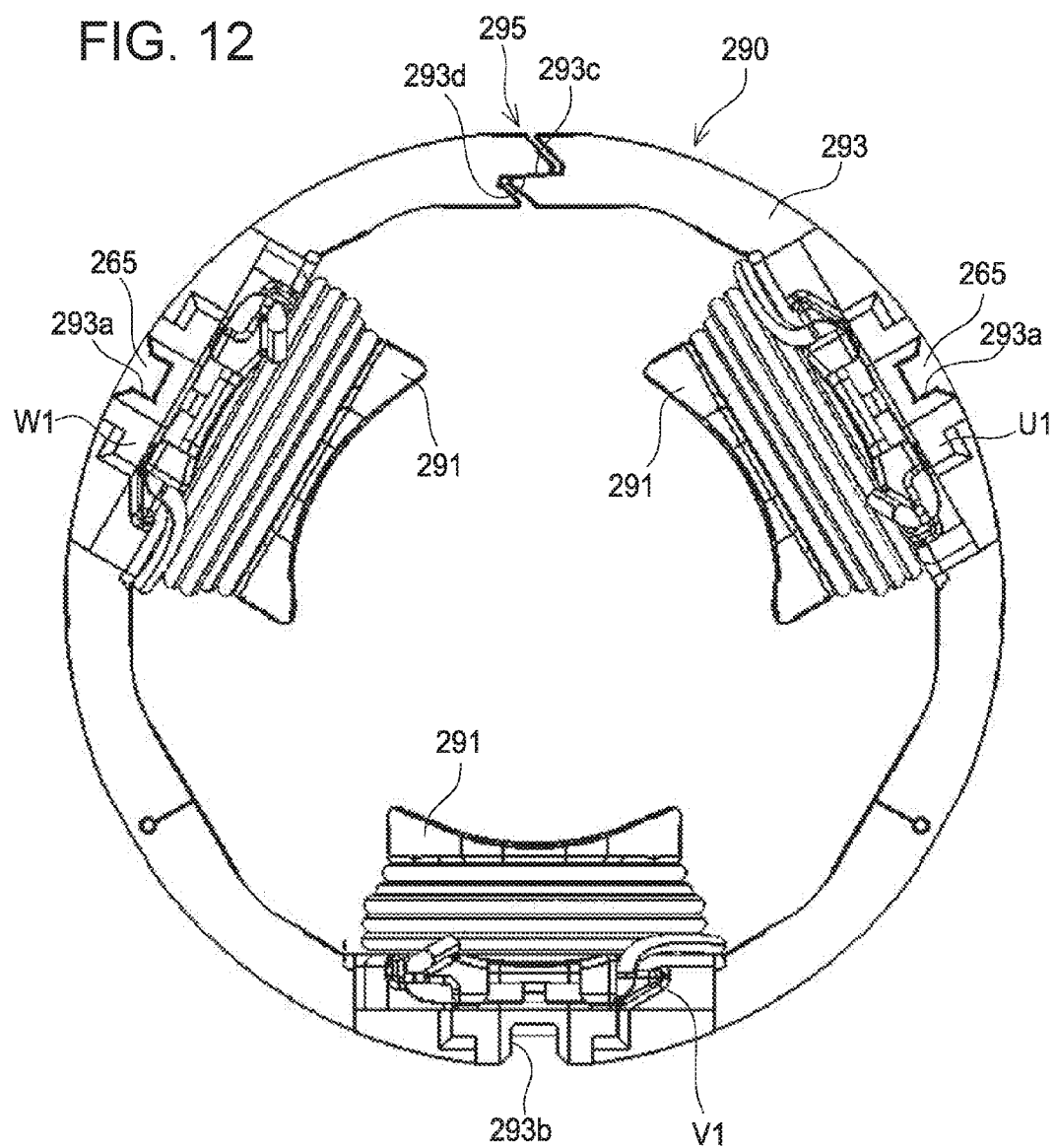

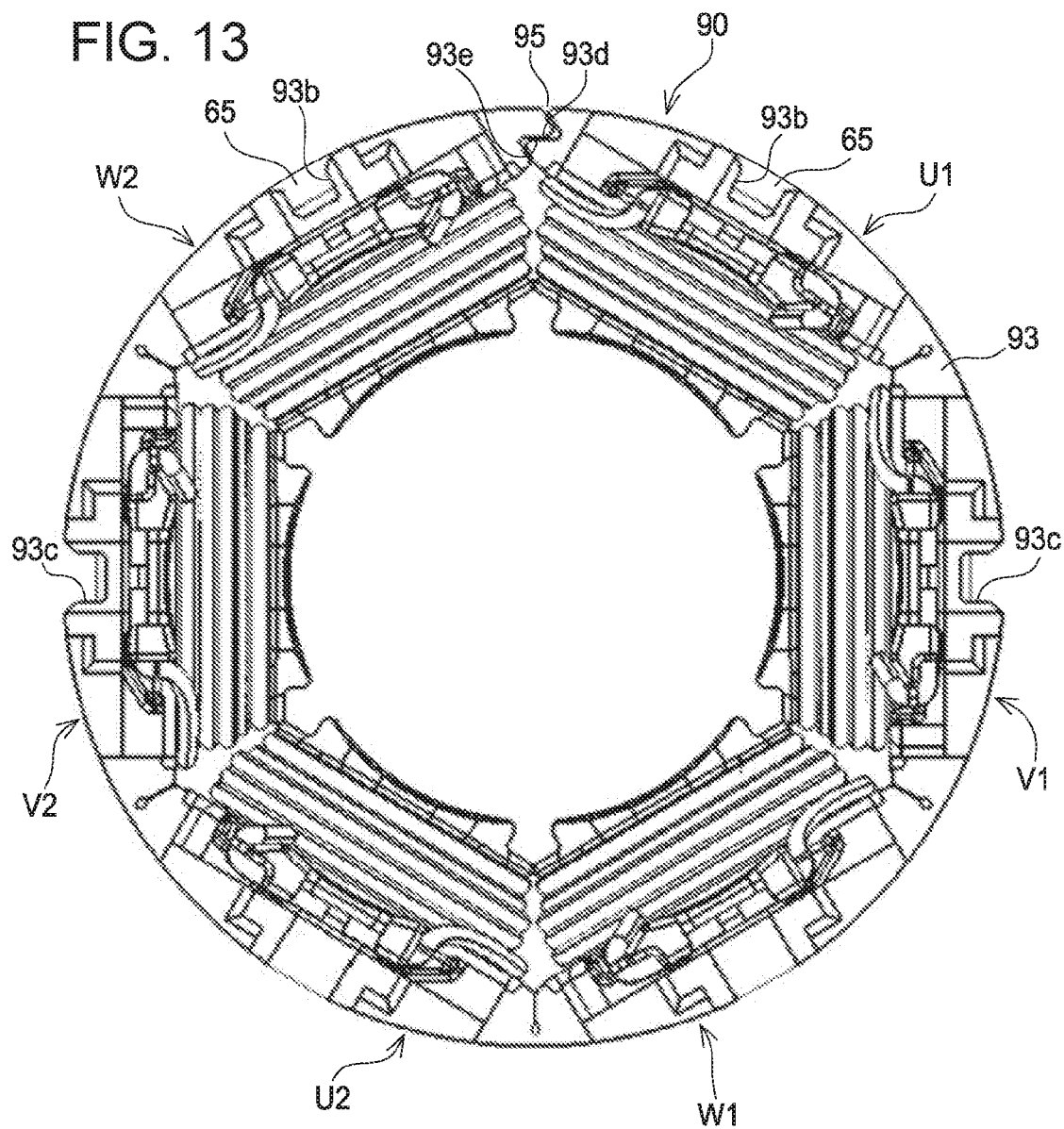

US 10,153,677 B2

STATOR AND ELECTRIC PUMP

CROSS-REFERENCE TO RELATED APPLICATION

This application claims priority to Japanese Patent Application No. 2015-008665 filed on Jan. 20, 2015, the entire contents of which are hereby incorporated by reference into the present application.

TECHNICAL FIELD

Technique disclosed herein relates to a stator used in a brushless motor and an electric pump including the brushless motor.

DESCRIPTION OF RELATED ART

Japanese Patent Application Publication No. 2009-17746 discloses a brushless motor provided with a stator including a plurality of stator divided cores. The plurality of stator divided cores form a cylindrical shape by being arranged annularly. Each of the plurality of stator divided cores makes contact with its adjacent stator divided cores at its both ends. The plurality of stator divided cores is covered by resin by being subjected to molding using a molding cast. That is, resin molding is performed with the stator divided cores arranged within the molding cast. Upon arranging the stator divided cores in the molding cast, they are arranged such that notches provided on radially inner portions of the stator divided cores engage with projections provided in the molding cast. Then, a plurality of pressing pins assembled in the molding cast is pressed onto outer diameters of the plurality of stator divided cores, and the stator divided cores are pressed against a core metal of the molding cast. The plurality of stator divided cores is thereby positioned within the molding cast.

SUMMARY

When resin molding using a molding cast is performed, residual stress is generated in the resin after molding by a molding pressure. Due to this, when stator divided cores onto which the resin is coated are taken out from the molding cast, the residual stress in the resin is released, as a result of which the resin tends to deform. As a result of this, positions of adjacent stator divided cores are displaced, and a stator may be deformed in some cases.

In the description herein, a technique that prevents the stator from deforming by resin molding is provided.

A technique disclosed herein relates to a stator of a brushless motor. A stator comprises a stator yoke, a plurality of teeth, and a cover. The stator yoke has a cylindrical shape and includes one or more yoke portions extending along a circumferential direction of the cylindrical shape. The plurality of teeth projects radially inward from an inner circumferential surface of the stator yoke, and is disposed with an interval between each other. The cover is configured of resin and covers inner circumferential surfaces of the plurality of teeth. The stator yoke comprises: a contact part at which an end surface of one yoke portion among the one or more yoke portions in the circumferential direction contacts the other end surface of the one yoke portion in the circumferential direction, or at which the end surface of the one yoke portion contacts an end surface of another one of the one or more yoke portions in the circumferential direction; a first groove extending along an axial direction of the cylindrical shape on an outer circumferential surface of the stator yoke in a vicinity of the contact part; and a second groove extending along the axial direction on the outer circumferential surface and disposed at a position spaced father away from the contact part than the first groove. The cover comprises a filling that fills the first groove. The second groove is hollow.

In this configuration, the stator has the inner circumferential surfaces of the teeth covered by the resin cover. A force directed from an inner circumference to an outer circumference of the stator yoke is applied to the stator yoke by a molding pressure applied upon molding, and post-molding residual stress generated in the cover. On the other hand, a force directed from the outer circumference to the inner circumference of the stator yoke is applied to the stator yoke in a vicinity of the contact part due to the molding pressure and residual stress of the resin filling filled in the first groove. According to this configuration, the force directed from the inner circumference to the outer circumference of the stator yoke and the force directed from the outer circumference to the inner circumference of the stator yoke, which are caused by the molding pressure applied upon the molding and the residual stress in the resin after the resin molding, cancel each other. As a result, the stator can be prevented from deforming due to the molding pressure applied upon the molding and the residual stress in the resin after the resin molding.

An electric pump that comprises: a brushless motor including the stator as above, and a rotor housed on an inner side of the stator and supported rotatably relative to the stator; and an impeller fixed to the rotor is also novel and useful.

BRIEF DESCRIPTION OF DRAWINGS

FIG. 10 shows a cross sectional diagram of the stator of the second embodiment in a cross section that vertically intersects with a stator axial direction;

FIG. 11 shows an upper view of cores and coils of a modification;

FIG. 12 shows an upper view of cores and coils of a modification; and

FIG. 13 shows an upper view of cores and coils of a modification.

DETAILED DESCRIPTION

Figure 1:
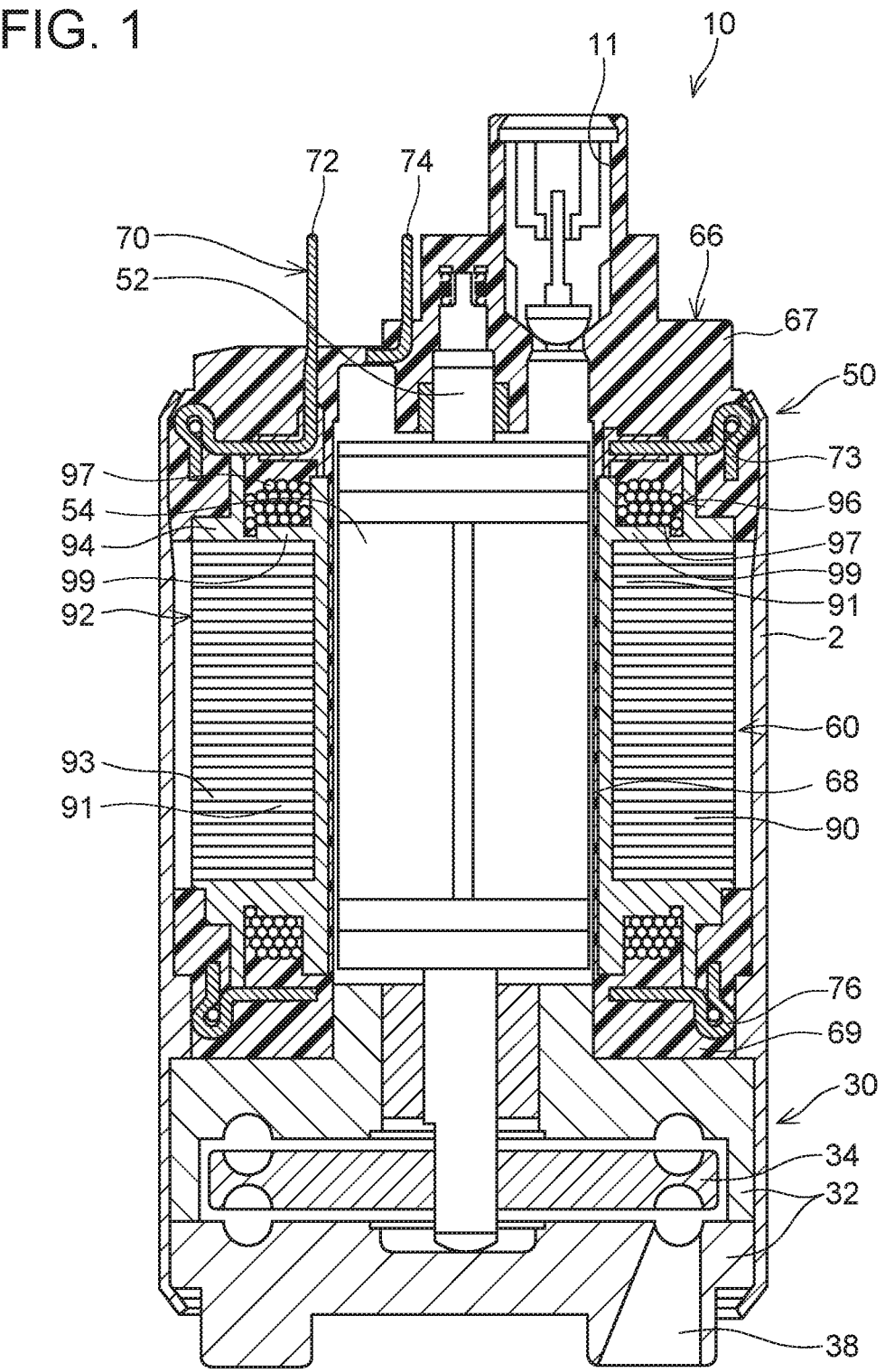
FIG. 1 shows a longitudinal cross-sectional view of a fuel pump.

Some of the features characteristic to below-described embodiments will herein be listed. It should be noted that the respective technical elements are independent of one another, and are useful solely or in combinations. The combinations thereof are not limited to those described in the claims as originally filed.

(Feature 1) In a stator, the first groove may extend from one end to the other end of the stator yoke along the axial direction. According to this configuration, a force directed from an outer circumference to an inner circumference of the stator yoke can be applied to the contact part over an entire length of the stator yoke from its upper end to its lower end by resin filled in the first groove. As a result, deformation of the stator can suitably be suppressed.

(Feature 2) In the stator, the filling may project farther outward than the outer circumferential surface of the stator yoke. According to this configuration, a structure in which the filling in the first groove contacts an inner surface of a casing of an electric pump upon installing the stator in the casing of the electric pump. As a result, the deformation of the stator can suitably be suppressed.

(Feature 3) In the stator, each end surface of the one or more yoke portions may extend along the circumferential direction of the stator yoke. In the contact part, the end surface of the one yoke portion may contact the other end surface of the one contact portion or the end surface of another one of the one or more yoke portions, that is positioned in a radial direction of the stator yoke relative to the end surface of the one yoke portion. According to this configuration, forces directed from the outer circumference to the inner circumference and from the inner circumference to the outer circumference of the stator yoke are applied to the contact part by residual stress in the cover, and the end surfaces of the yoke portions are pressed in the radial direction of the stator yoke. Due to this, a firm contact is achieved in the contact part.

(Feature 4) In the stator, in assuming that the plurality of teeth includes at least one set of teeth, which includes one U-phase tooth, one V-phase tooth, and one W-phase tooth that are adjacent to one another, the one or more yoke portions may be connected to outer circumferential ends of the teeth of the at least one set of teeth. According to this configuration, the teeth of the three phases are prevented from being arranged on different yoke portions from one another. Due to this, as compared to a configuration in which a contact part is intervened between the three-phase teeth, iron loss can be suppressed.

(Feature 5) In the stator, the first groove may be disposed on an outer side of one of the plurality of teeth in a radial direction of the stator yoke, and the second groove may be disposed on the outer side of another one of the plurality of teeth in the radial direction of the stator yoke. According to this configuration, the iron loss generated by the formation of the grooves in the stator yoke can be suppressed.

(Feature 6) The first groove may be disposed on an outer side of the contact portion in the radial direction of the stator yoke. According to this configuration, the force directed from the outer circumference to the inner circumference of the stator yoke can directly be applied to the contact part by the resin filled in the first groove.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved stators and electric pumps, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENTS

First Embodiment

As shown in FIG. 1, a stator 60 according to the present embodiment is used in a fuel pump 10. The fuel pump 10 is disposed in a fuel tank (not shown). The fuel pump 10 supplies fuel (such as gasoline) to an engine (not shown) of a vehicle such as an automobile. As shown in FIG. 1, the fuel pump 10 includes a motor portion 50 and a pump portion 30. The motor portion 50 and the pump portion 30 are disposed in a housing 2. The housing 2 has a cylindrical shape with both of its axial ends opened.

The pump portion 30 comprises a casing 32 and an impeller 34. The casing 32 closes an opening of a lower end of the housing 2. At the lower end of the casing 32, an intake port 38 is provided. At an upper end of the casing 32, a through-hole (not shown) for communicating between an inside of the casing 32 and the motor portion 50 is provided. The impeller 34 is provided within the casing 32.

The motor portion 50 is positioned above the pump portion 30. The motor portion 50 is a brushless motor, and is a three-phase motor. The motor portion 50 comprises a rotor 54 and a stator 60. The rotor 54 comprises permanent magnets. At a center of the rotor 54, a shaft 52 is fixed by penetrating the rotor 54. A lower end of the shaft 52 is inserted into a center portion of the impeller 34, and penetrates the impeller 34. The rotor 54 is rotatably supported around the shaft 52 by bearings disposed at both end portions of the shaft 52. In the embodiment, a vertical alignment is defined based on a state of FIG. 1. That is, the pump portion 30 is positioned "below" or "lower side", as viewed from the motor portion 50, and the motor portion 50 is positioned "above" or "upper side", as viewed from the pump portion 30.

The stator 60 includes a resin layer 66, a core 90, a plurality of (in the present embodiment, six) coils 96 disposed in the core 90, and a group of terminals 70. The core 90 includes core plate groups (92, 92, •) and an insulator 94 provided on surfaces of the core plate groups (92, 92, •). Each core plate group (92, 92, •) includes a plurality of core plates 92. It should be noted that in preference to viewability, FIG. 1 omits hatching that represents cross-sections of the plurality of core plates 92. The plurality of core plates 92 is vertically stacked on top of each other. Each of the core plates 92 is made of a magnetic material. Each core plate group (92, 92 ••) includes a cylindrical yoke 93 and a plurality of teeth 91. The yokes 93 configure a side wall of the stator 60. The plurality of teeth 91 extends from an inner circumferential surface of the yoke 93 toward a central axis of the yoke 93. The insulator 94 is made of an insulating resin material. The insulator 94 covers the surfaces of the core plate groups (92, 92 ••) constituted by the plurality of core plates 92 stacked on top of each other.

Figure 2:
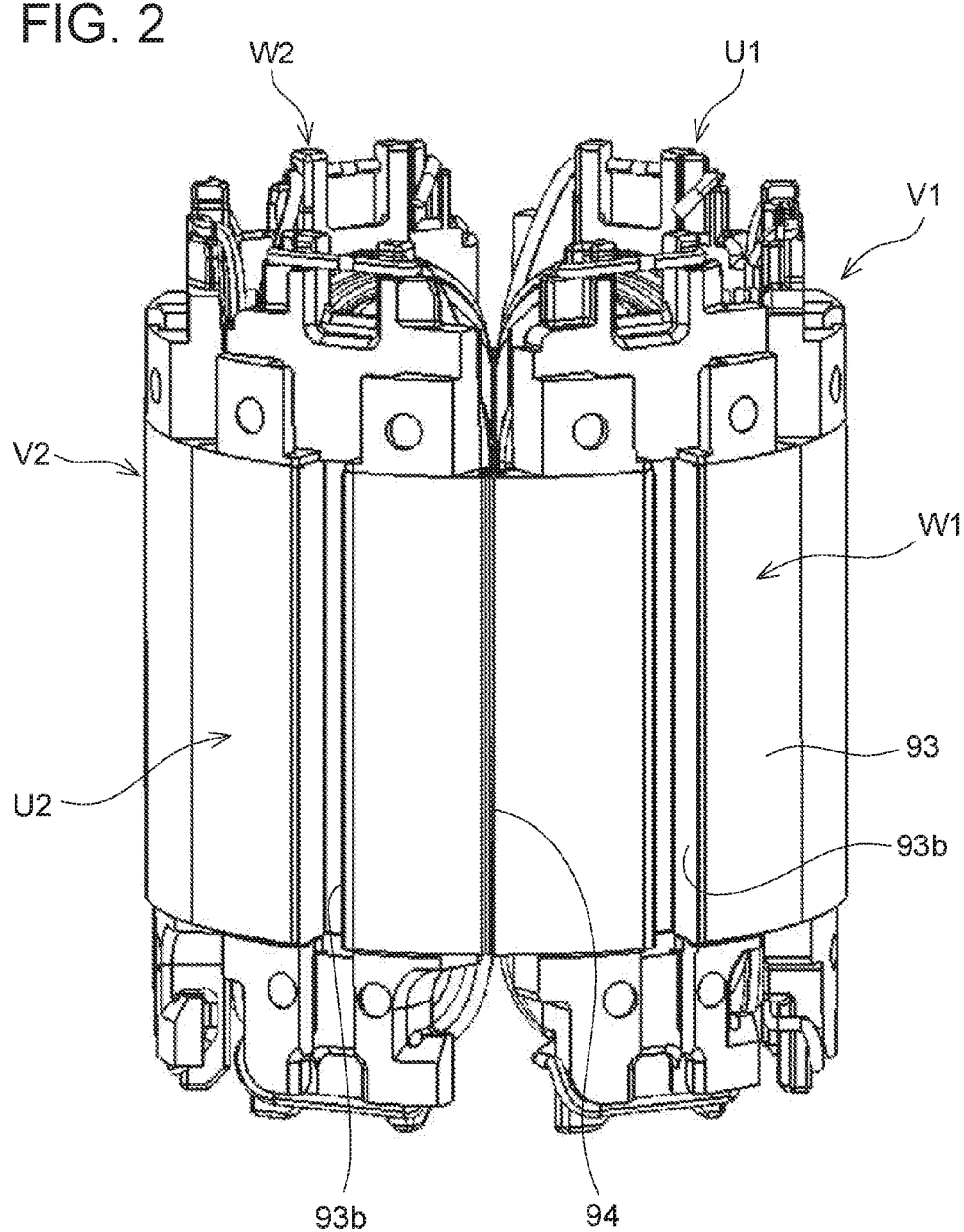
FIG. 2 shows a perspective view of cores and coils of a first embodiment.
Figure 3:
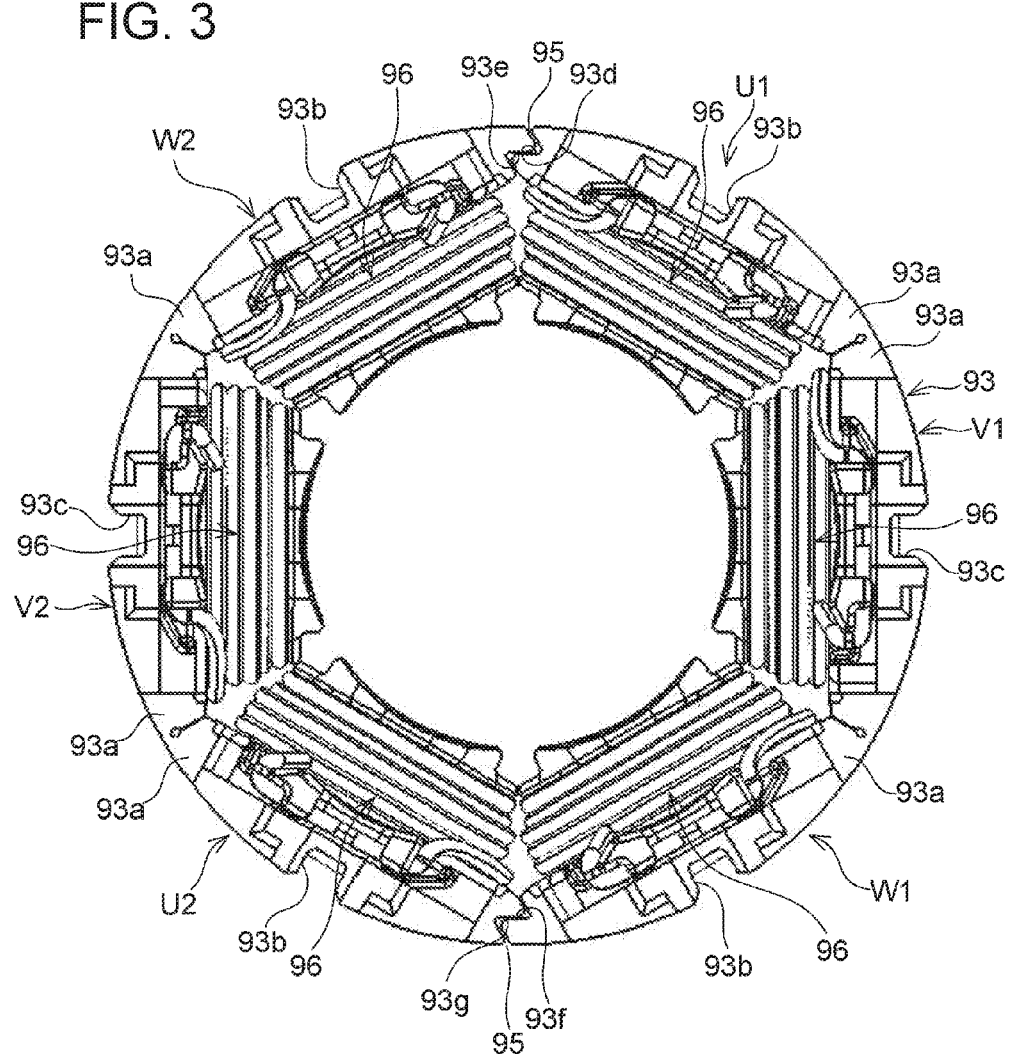
FIG. 3 shows an upper view of the cores and coils of the first embodiment.
Figure 4:
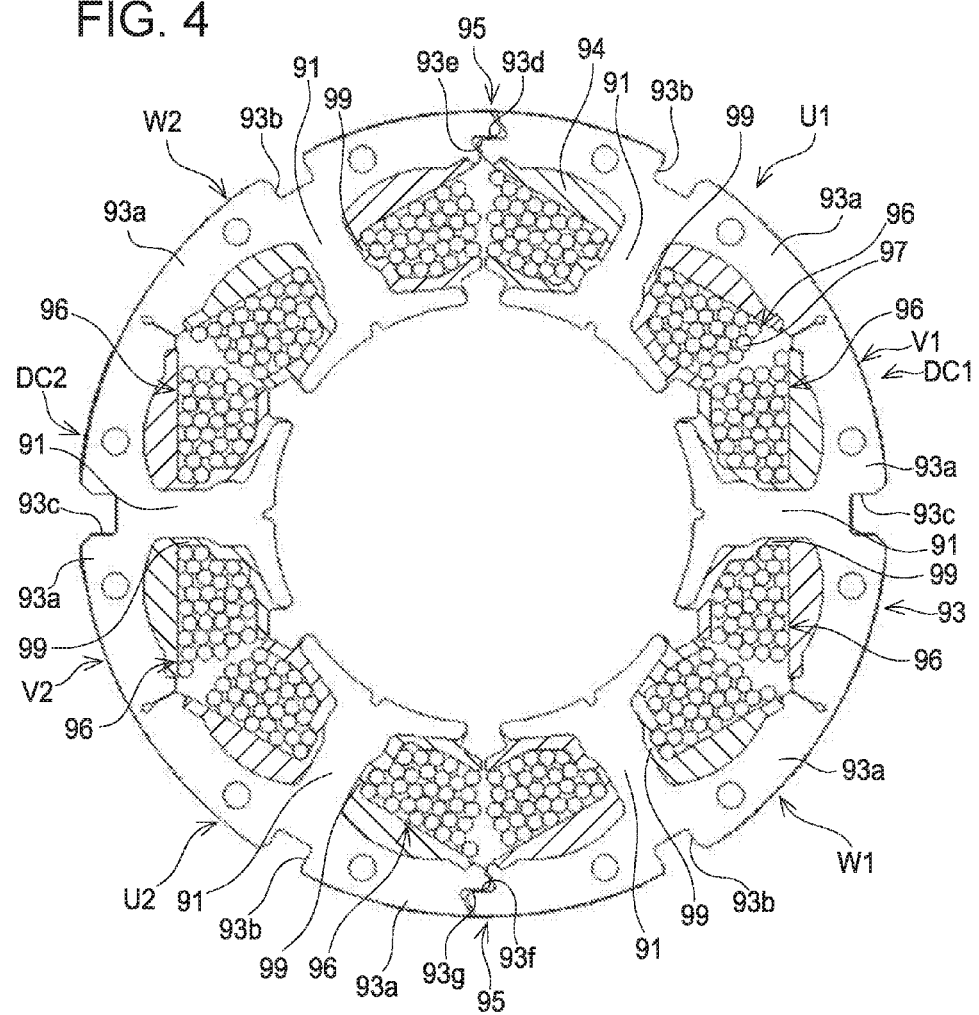
FIG. 4 shows a cross sectional diagram of the cores and coils of the first embodiment in a cross section that vertically intersects with a core axial direction.

As shown in FIGS. 2 to 4, the core 90 includes six partial cores U1, V1, W1, U2, V2, and W2. As shown in FIG. 3, the six partial cores U1 to W2 are disposed in a cylindrical shape. The six partial cores U1 to W2 include two U-phase partial cores U1 and U2, two V-phase partial cores V1 and V2, and two W-phase partial cores W1 and W2. Since the partial cores U1 to W2 are substantially identical in configuration to each other, the partial core U1 is described as a representative example. FIG. 2 and the other drawings omit to show any of the core plates 92 of the core plate groups (92, 92 ••), although the core plate groups (92, 92 ••) are exposed on a side surface of the core 90.

FIG. 4 is a cross sectional view that vertically intersects the core 90 and the coils 96 in an axial direction, that is, in the up and down direction, of the core 90, in which a cross section positioned on a same plane as an upper surface of the core plate 92 arranged at an intermediate position among the stacked plurality of core plates 92 is seen from above. Notably, in FIG. 4, hatching that represents cross-sections of wirings 97 is omitted for the sake of viewablity. The partial core U1 includes a partial yoke 93a, a tooth 91, a bobbin 99. The partial yoke 93a is a part of the yoke 93 and is located on the outermost circumferential side of the partial core U1. It should be noted that the yoke 93 is constituted by six partial yokes 93a of the partial cores U1 to W2. The partial yoke 93a has a partially cylindrical shape. A groove 93b is arranged on an outer circumferential surface of the partial yoke 93a. As shown in FIG. 2, the groove 93b extends from an upper end to a lower end of the stator yoke 93 in parallel to the axial direction of the stator yoke 93. Notably, grooves 93c having similar shape as the groove 93b are arranged on outer circumferential surfaces of the partial cores V1, V2. As will be described later, the grooves 93b and the grooves 93c have different purposes.

The partial yoke 93a of the partial core U1 is connected integral to the partial yoke 93a of the partial core V1 that is adjacent on one side thereof. On the other hand, the partial yoke 93a of the partial core U1 is not connected integral to the partial yoke 93a of the partial core W2 that is adjacent on the other side thereof. The partial yoke 93a of the partial core U1 includes a contact surface 93d positioned at its end on a partial core W2 side. The contact surface 93d is facing toward a radially outer side relative to the stator yoke 93, and extends from the upper end to the lower end of the stator yoke 93 in the axial direction. The contact surface 93d makes contact with a contact surface 93e of the partial yoke 93a of the adjacent partial core W2 in the radial direction of the stator yoke 93. Notably, the contact surface 93e is facing toward a radially inner side relative to the stator yoke 93, and extends from the upper end to the lower end of the stator yoke 93 in the axial direction.

The partial yoke 93a of the partial core V1 is connected integral to each of the partial yoke 93a of the partial core U1 and the partial yoke 93a of the partial core W1 that are adjacent thereto. The partial yoke 93a of the partial core W1 is connected integral to the partial yoke 93a of the partial core V1 that is adjacent on one side thereof, but is not connected integral to the partial yoke 93a of the partial core U2 that is adjacent on the other side thereof. The partial yoke 93a of the partial core W1 includes a contact surface 93f positioned at its end on a partial core U2 side. The contact surface 93f is facing toward the radially inner side relative to the stator yoke 93, and extends from the upper end to the lower end of the stator yoke 93 in the axial direction. The contact surface 93f makes contact with a contact surface 93g of the partial yoke 93a of the adjacent partial core U2 in the radial direction relative to the stator yoke 93. Notably, the contact surface 93g is facing toward the radially outer side relative to the stator yoke 93, and extends from the upper end to the lower end of the stator yoke 93 in the axial direction. As shown in FIG. 2, the contact surface 93f and the contact surface 93g configure a contact part 95 that extends from the upper end to the lower end of the stator yoke 93 in parallel to the axial direction of the stator yoke 93. Similarly, the contact surface 93d and the contact surface 93e configure a contact part 95 that extends from the upper end to the lower end of the stator yoke 93 in parallel to the axial direction of the stator yoke 93

The three partial cores U1, V1, W1 are connected integral to each other by their partial yokes 93a. The three partial cores U1, V1, W1 are collectively termed a divided core DC1. The three partial yokes 93a included in the three partial cores U1, V1, W1 that are included in the divided core DC1 are an example of "yoke portions".

Returning to FIG. 4, the partial yoke 93a of the partial core U2 is connected integral to the partial yoke 93a of the partial core V2 that is adjacent thereto. The partial yoke 93a of the partial core V2 is connected integral to each of the partial yoke 93a of the partial core U2 and the partial yoke 93a of the partial core W2 that are adjacent thereto. The partial yoke 93a of the partial core W2 is connected integral to the partial yoke 93a of the partial core V2, that is adjacent on an opposite side from the partial yoke 93a of the partial core U1. The cylindrical shape is formed by the partial yokes 93a of the six partial cores U1 to W2 being connected.

The three partial cores U2, V2, W2 are connected integral to each other by their partial yokes 93a. The three partial cores U2, V2, W2 are collectively termed a divided core DC2. The three partial yokes 93a included in the three partial cores U2, V2, W2 that are included in the divided core DC2 are an example of "yoke portions".

A tooth 91 extending toward a center axis of the stator 60 (i.e., center axis of the shaft 52) is arranged at a center portion of each partial yoke 93a. In each core plate 92, the tooth 91 is configured of a portion projecting from the partial yoke 93a toward an inner circumference of the partial yoke 93a. The six teeth 91 arranged on the six partial cores U1 to W2 are arranged at regular intervals in the circumferential direction of the stator yoke 93. An inner circumferential end of each tooth 91 extends in a circumferential direction of the partial yokes 93a, and has a shape corresponding to an outer circumferential surface of the rotor 54. Side surfaces of the teeth 91 are covered by an insulator 94.

Each bobbin 99 is configured of the insulator 94. Each bobbin 99 is provided with a coil 96. Each coil 96 is configured by a wiring 97 being wound on the bobbin 99. The coils 96 are electrically connected to the group of terminals 70. Further, the coil 96 of the partial core U1 is connected to the coil 96 of the partial core U2, so a potential of a same phase is supplied to the coil 96 of the partial core U1 and the coil 96 of the partial core U2. Similarly, the coil 96 of the partial core V1 is connected to the coil 96 of the partial core V2, so a potential of a same phase is supplied to the coil 96 of the partial core V1 and the coil 96 of the partial core V2. Further, similarly, the coil 96 of the partial core W1 is connected to the coil 96 of the partial core W2, so a potential of a same phase is supplied to the coil 96 of the partial core W1 and the coil 96 of the partial core W2.

Next, a connection state between the coils 96 and the group of terminals 70 will be described. As shown in FIG. 1, each coil 96 is electrically connected to an input terminal 72 of the group of terminals 70. The input terminal 72 is a terminal for supplying each of U phase, V phase, and W phase to the coils 96. The input terminal 72 includes three terminal parts corresponding respectively to the U phase, V phase, and W phase. The terminal part for the U phase electrically connects to the coils 96 of the partial cores U1, U2. The terminal part for the V phase electrically connects to the coils 96 of the partial cores V1, V2. The terminal part for the W phase electrically connects to the coils 96 of the partial cores W1, W2.

Notably as shown in FIG. 1, a ground terminal 74 is arranged on an inner circumference side of the input terminal 72. The ground terminal 74 is a terminal for preventing electric corrosion inside the fuel pump 10. The ground terminal is electrically in contact with the housing 2, and shuts off radiation of a switching noise of a driving circuit (not shown) of the motor portion 50, which is emitted from the coils 96 wound on the stator 60 in the housing 2. Further, the coils 96 are electrically in contact with a common terminal 76 at a lower end part of the stator 60. The common terminal 76 is electrically connected to the six coils 96.

(Method of Manufacturing Stator)

Figure 5:
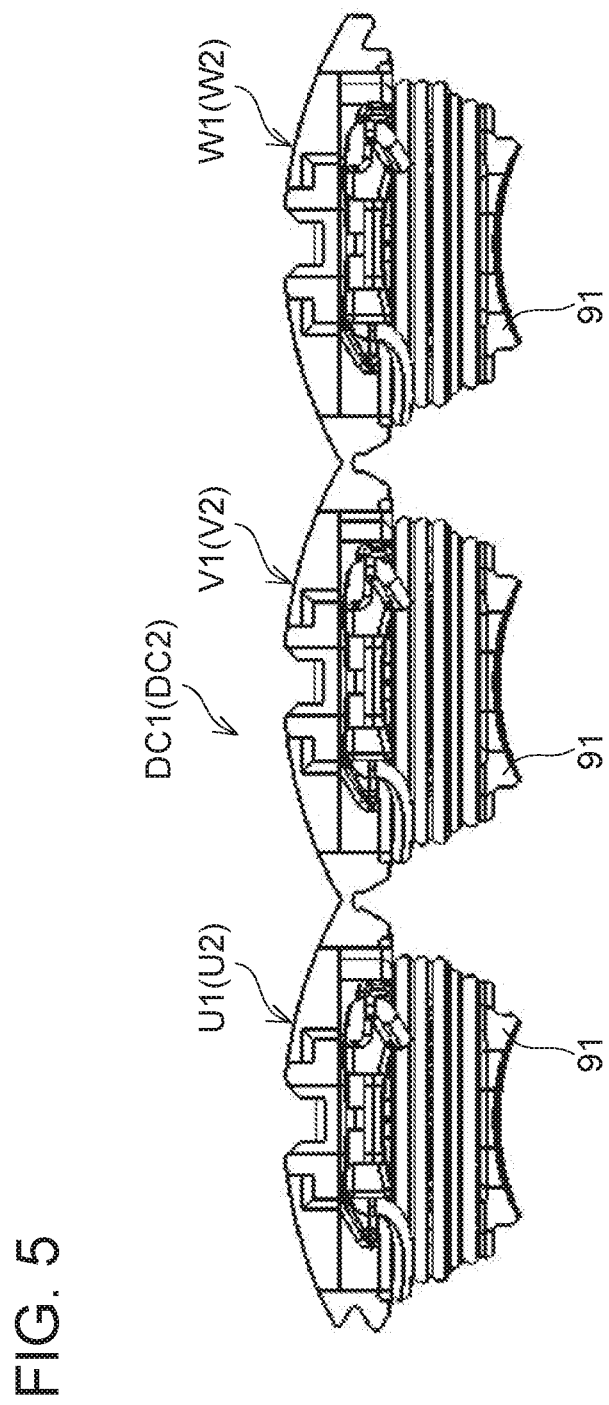
FIG. 5 shows an upper view of divided cores of the first embodiment in an expanded state.

As shown in FIG. 5, in the divided core DC1 (DC2), the coils 96 are wound on the respective teeth 91 in a state where the partial cores U1 (U2), V1 (V2), W1 (W2) are connected in a line. According to this configuration, the teeth 91 can easily be wound on the coils 96. After the coils 96 are wound, the connecting portions of the partial yokes 93a of the partial cores U1 (U2), V1 (V2), W1 (W2) are bent, and the semispherical divided core DC1 (DC2) is formed.

Next, the contact surface 93d of the divided core DC1 and the contact surface 93e of the divided core DC2, on which the coils 96 are wound, are caused to make contact, and the contact surface 93f of the divided core DC1 and the contact surface 93g of the divided core DC2 are caused to make contact, as a result of which the core 90 shown in FIGS. 2 to 4 is manufactured.

Figure 6:
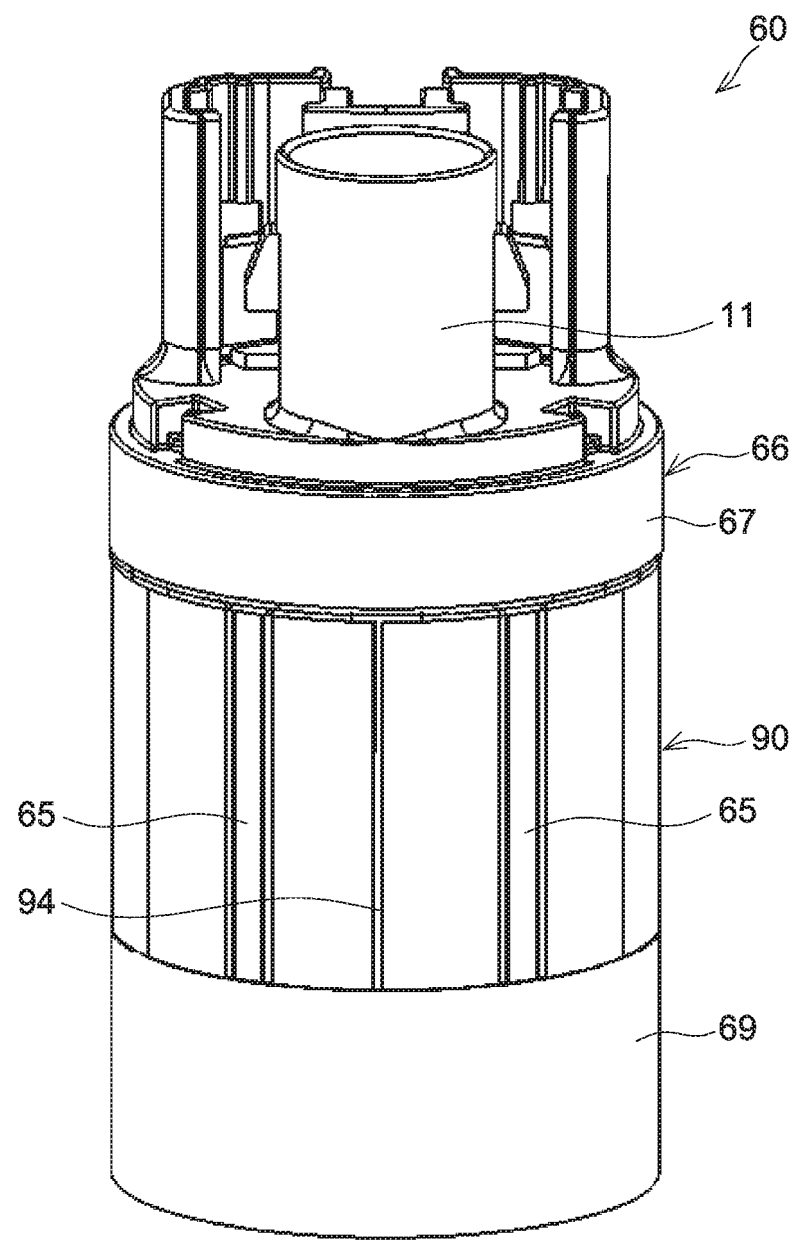
FIG. 6 shows a perspective view of a stator of the first embodiment.

Then, the group of terminals 70 is attached to the core 90, and the core 90 onto which the group of terminals 70 is attached is set in a mold. At this occasion, the two grooves 93c arranged on the outer circumferential surface of the stator yoke 93 make contact with protrusions arranged in the mold, and thereby the core 90 can be positioned within the mold. Then, resin molding using the mold is performed to form the resin layer 66. Due to this, the stator 60 shown in FIG. 6 is manufactured.

The resin layer 66 includes an upper end resin part 67 and a lower end resin part 69 arranged on upper and lower ends of the stator 60. The upper end resin part 67 closes an opening at an upper end of the housing 2. A discharge port 11 is provided on an upper surface of the upper end resin part 67. The discharge port 11 communicates the motor portion 50 and a fuel passage outside the fuel pump 10. The discharge port 11 is an opening for discharging the fuel pressurized by the pump portion 30 out to the fuel passage. In the resin layer 66, a portion covering the stator 60 and the discharge port 11 are formed integrally by resin. Notably, the portion covering the stator 60 and the discharge port 11 may be configured separately.

Figure 7:
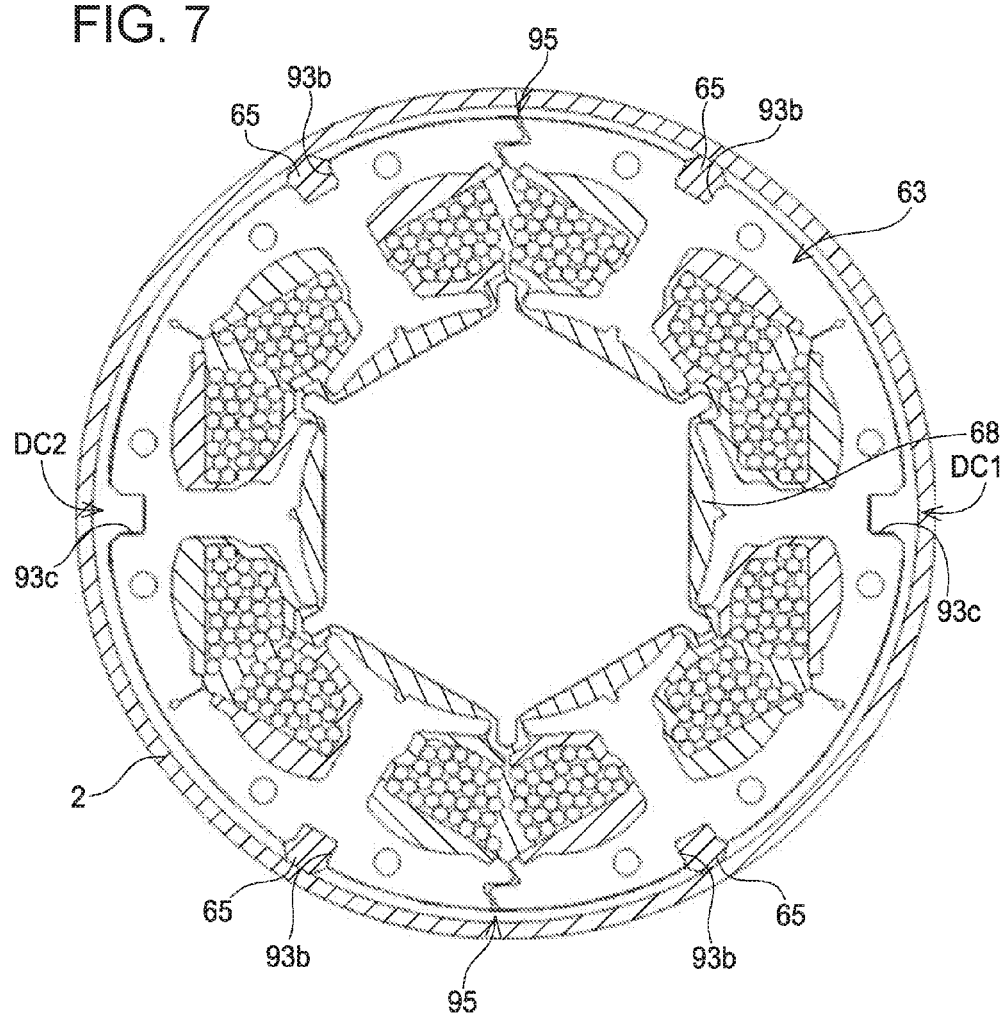
FIG. 7 shows a cross sectional diagram of the stator of the first embodiment in a cross section that vertically intersects with a stator axial direction.

The lower end resin part 69 is arranged on an upper portion of the casing 32. The resin layer 66 further includes an inner circumferential resin part 68 arranged on the inner circumferential surface of the stator 60 (see FIG. 1), and outer circumferential resin parts 65 arranged on the outer circumferential surface of the stator 60. The outer circumferential resin parts 65 extend parallel to the axial direction of the stator 60, and are connected to the upper end resin part 67 and the lower end resin part 69. As shown in FIG. 7, the outer circumferential resin parts 65 are filled respectively in the four grooves 93b. The outer circumferential resin parts 65 project out from the grooves 93b toward the outer circumferential side of the stator 60. Due to this, in a state where the housing 2 is attached to the stator 60, the outer circumferential resin part 65 makes contact with an inner circumferential surface of the housing 2. On the other hand, the resin is not filled in the two grooves 93c. That is, the two grooves 93c are hollow.

As shown in FIG. 1, the inner circumferential resin part 68 covers the inner circumferential surfaces of the teeth 91. It extends in parallel to the axial direction of the stator 60, and are connected to the upper end resin part 67 and the lower end resin part 69. As shown in FIG. 7, the inner circumferential resin part 68 forms a full circle in a circumferential direction of the stator 60.

Effects of Embodiment

Figure 8:
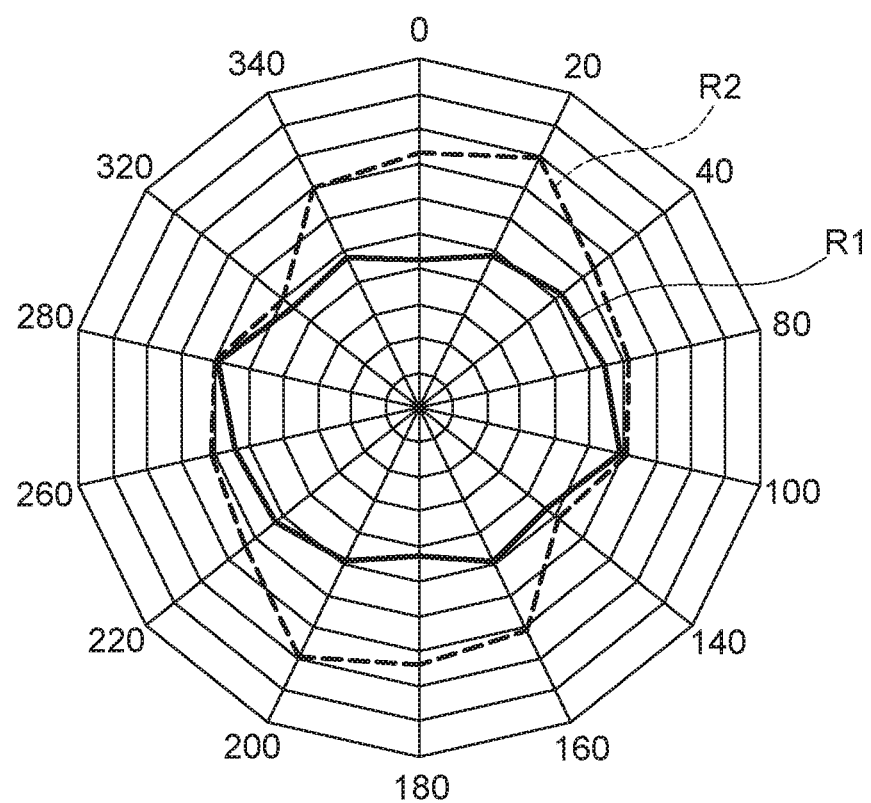
FIG. 8 shows a graph indicating an experiment result.

Upon arranging the core 90 in the mold and forming the resin layer 66, molten resin is compressed and poured into the mold. As a result, in the resin layer 66 after the molding, residual stress is generated after the molding due to an application of molding pressure during the molding. With the molding pressure and the residual stress on the inner circumferential resin part 68, the stator 60 is applied with force directed from the inner circumference to the outer circumference of the stator 60. A graph of FIG. 8 is a graph showing an experiment result considering how the stator 60 taken out from the mold of the resin layer 66 deforms depending on the presence and absence of the outer circumferential resin parts 65. A result R1 is a result that measured a position of the outer circumferential surface of the stator 60 of the present embodiment (i.e., the outer circumferential surface of the stator yoke 93) every 20 degrees in the circumferential direction of the stator yoke 93. A result R2 is a result that measured the position of the outer circumferential surface of the stator yoke 93 in the stator 60 every 20 degrees in the circumferential direction of the stator yoke 93 in a case where the outer circumferential resin parts 65 were not provided. Notably, the figures described along an outer periphery of this graph are rotation angles in a case where the contact part 95 between the partial core U1 and the partial core W2 is set to be 0 degrees. That is, the contact parts 95 are present at positions of 0 degrees and 180 degrees in this graph.

As is apparent from the experiment, in a case of not arranging any outer circumferential resin parts 65 (i.e., the result R2), the stator yoke 93 deformed greatly toward the outer side of the stator yoke 93 due to the molding pressure and the residual stress in the inner circumferential resin part 68. On the other hand, in the stator 60 of the present embodiment (i.e., the result R1), the deformation of the stator yoke 93 is suppressed at the contact parts 95. This is assumed to be due to the fact that the force directed from the inner circumference to the outer circumference of the stator yoke 93 is applied onto the stator yoke 93 in the vicinities of the contact parts 95 by the molding pressure upon the molding and the post-molding residual stress in the outer circumferential resin parts 65 arranged in the vicinities of the contact parts 95. Further, since the outer circumferential resin parts 65 are connected to the upper end resin part 67 and the lower end resin part 69, the stator yoke 93 in the vicinities of the contact parts 95 is prevented from deforming toward the outer circumferential side by the outer circumferential resin parts 65. Due to this, the inner circumferential surface of the stator 60 is provided with a shape of a more precise true circle, as a result of which motor efficiency of the motor portion 50 can be improved.

Further, the outer circumferential resin parts 65 protrude from the grooves 93b toward the outer circumferential side of the stator 60 to make contact with the inner circumferential surface of the housing 2. As a result, the deformation of the contact parts 95 is suitably suppressed by the housing 2.

Further, the contact surfaces 93d to 93g make contact along the radial direction of the stator 60. According to this configuration, the molding pressure and the residual stress of the resin layer 66 applies the contact parts 95 with a force directed from the outer circumference to the inner circumference of the stator yoke 93 as well as the force directed from the inner circumference to the outer circumference of the stator yoke 93, as a result of which the contact surfaces 93d to 93g press each other in the radial direction of the stator yoke 93. Due to this, the contact parts 95 can be caused to make firm contact. Thus, iron loss generated in the contact parts 95 can be reduced, and the motor performance can be improved.

Further, the divided cores DC1, DC2 have the three-phase partial cores, namely of the U phase, the V phase, and the W phase, connected integrally. The teeth of the three phases can be prevented from being arranged on different yoke parts. Due to this, as compared to a configuration that includes a contact part 95 where the yoke part is disconnected in between the teeth of the three phases, the iron loss can be suppressed.

Further, the grooves 93b, 93c are positioned on the outer side of the teeth 91 in the radial direction of the stator yoke 93. According to this configuration, the grooves 93b, 93c can be provided at positions where an influence to magnetic flux would be minimized. Due to this, the iron loss that is generated by providing the grooves 93b, 93c in the stator yoke 93 can be suppressed.

Second Embodiment

Figure 9:
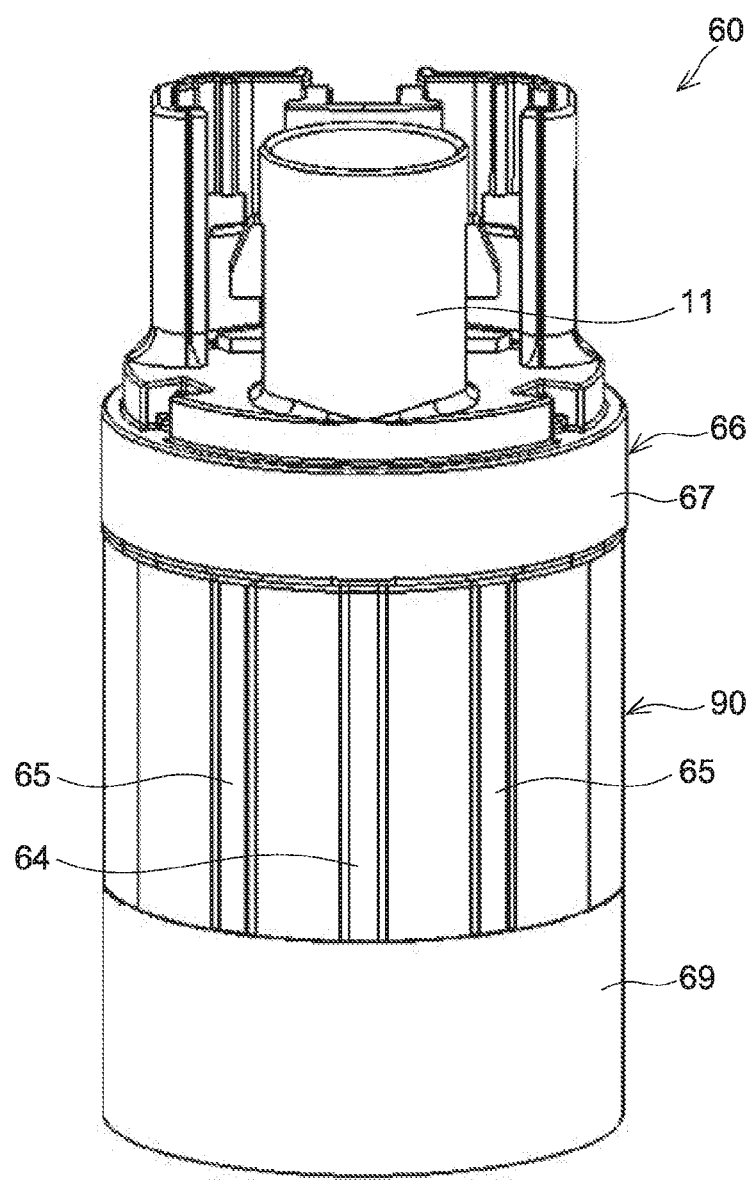
FIG. 9 shows a perspective view of a stator of a second embodiment.

Points different from the first embodiment will be described with reference to FIGS. 9 and 10. In the stator 60 of the second embodiment, the stator yoke 93 includes grooves 93h, 93i similar to the grooves 93b on an outer side of the contact parts 95 in the radial direction of the stator yoke 93. The grooves 93h, 93i extend from the upper end to the lower end of the stator yoke 93. The resin layer 66 includes outer circumferential resin parts 64 that are filled in the grooves 93h, 93i. The outer circumferential resin parts 64 are connected to the upper end resin part 67 and the lower end resin part 69.

According to this configuration, the contact parts 95 can directly be pressed by the outer circumferential resin parts 64 filled in the grooves 93h, 93i, in addition to the outer circumferential resin parts 65 filled in the grooves 93b.

Notably, the outer circumferential resin parts 64, 65 of the second embodiment may protrude from the grooves 93h, 93i, 93b to a degree by which they make contact with the housing 2, similar to the outer circumferential resin parts 65 of the first embodiment.

(1) In the aforementioned embodiments, the stator 60 includes six teeth 91. However, the number of the teeth is not limited to the above embodiments. For example, as shown in FIG. 11, a stator may include nine teeth 191. Notably, in FIG. 11, a core 190 and outer circumferential resin parts 165 are shown. The nine teeth 191 respectively may be included in three U-phase partial cores U1, U2, U3, three V-phase partial cores V1, V2, V3, and three W-phase partial cores W1, W2, W3. The nine partial cores U1 to W3 may be divided into a divided core DC1 including six partial cores U1 to W2 and a divided core DC2 including three partial cores U3 to W3. The divided core DC1 may configure a cylindrical core 190 by having each one of its contact surface 193e and contact surface 193f make contact with corresponding one of a contact surface 193d and a contact surface 193g of the divided core DC2. Due to this, a cylindrical stator yoke 193 may be configured. Grooves 193c arranged on an outer circumferential surface of the stator yoke 193 may have outer circumferential resin parts 165 provided therein. On the other hand, no outer circumferential resin part may be provided in grooves 193b arranged on the outer circumferential surface of the stator yoke 193. Notably, in the present modification, the nine partial cores U1 to W3 may be divided into a divided core DC1 including three partial cores U1 to W1 and a divided core DC2 including three partial cores U2 to W2, and a divided core DC3 including three partial cores U3 to W3, and each of them may be caused to make contact with its adjacent divided cores by contact surfaces.

Alternatively, for example, as shown in FIG. 12, a stator may be provided with three teeth 291. Notably, in FIG. 12, a core 290 and outer circumferential resin parts 265 are shown. The three teeth 291 may respectively be included in one U-phase partial core U1, one V-phase partial core V1, and one W-phase partial core W1. The three partial cores U1 to W1 may be connected integrally. Further, the three partial cores U1 to W1 may configure a cylindrical core 290 by having their contact surface 293c and contact surface 293d positioned at both ends of the core 290 make contact. Due to this, a cylindrical stator yoke 293 may be configured. Grooves 293a arranged on an outer circumferential surface of the stator yoke 293 may have outer circumferential resin parts 265 similar to the outer circumferential resin parts 65 provided therein. On the other hand, no outer circumferential resin part may be provided in a groove 293b arranged on the outer circumferential surface of the stator yoke 293.

(2) In the above embodiments, the core 90 is divided into two divided cores DC1, DC2. However, as shown in FIG. 13 the core 90 does not need to be divided into a plurality of divided cores. In this case, in the core 90, the stator yoke 93 may be split by only one contact part 95.

(3) In the above embodiments, the grooves 93b where the outer circumferential resin parts 65 are filled are arranged on the outer circumferential side of the teeth 91 of the partial cores U1, W1, U2, W2 that are adjacent to the contact parts 95. However, the grooves 93b may be arranged at portions other than the outer circumferential side of the teeth 91. For example, they may be arranged at positions closer to the contact parts 95 than the outer circumferential side of the teeth 91 of the partial cores U1, W1, U2, W2. Alternatively, they may be arranged at positions farther from the contact parts 95 than the outer circumferential side of the teeth 91 of the partial cores U1, W1, U2, W2. The grooves 93b of the present modification are also included in "a first groove extending along an axial direction on an outer circumferential surface in a vicinity of a contact part".

What is claimed is:

1. A stator of a brushless motor, the stator comprising:
a stator yoke having a cylindrical shape and including one or more yoke portions extending along a circumferential direction of the cylindrical shape;
a plurality of teeth projecting radially inward from an inner circumferential surface of the stator yoke, and disposed with an interval between each other; and
a cover configured of resin and covering inner circumferential surfaces of the plurality of teeth,
wherein
the stator yoke comprises:
    a contact part at which an end surface of one yoke portion among the one or more yoke portions in the circumferential direction contacts the other end surface of the one yoke portion in the circumferential direction, or at which the end surface of the one yoke portion contacts an end surface of another one of the one or more yoke portions in the circumferential direction;
    a first groove extending along an axial direction of the cylindrical shape on an outer circumferential surface of the stator yoke in a vicinity of the contact part; and
    a second groove extending along the axial direction on the outer circumferential surface and disposed at a position spaced father away from the contact part than the first groove,
the cover comprises a filling that fills the first groove, and the second groove is hollow.

2. The stator as in claim 1, wherein
the first groove extends from one end to the other end of the stator yoke along the axial direction.

3. The stator as in claim 1, wherein
the filling projects farther outward than the outer circumferential surface of the stator yoke.

4. The stator as in claim 1, wherein
each end surface of the one or more yoke portions extends along the circumferential direction of the stator yoke, and
in the contact part, the end surface of the one yoke portion contacts the other end surface of the one contact portion or the end surface of another one of the one or more yoke portions that is positioned in a radial direction of the stator yoke relative to the end surface of the one yoke portion.

5. The stator as in claim 1, wherein
in assuming that the plurality of teeth includes at least one set of teeth, which includes one U-phase tooth, one V-phase tooth, and one W-phase tooth that are adjacent to one another,
the one or more yoke portions are connected to outer circumferential ends of the teeth of the at least one set of teeth.

6. The stator as in claim 1, wherein
the first groove is disposed on an outer side of one of the plurality of teeth in a radial direction of the stator yoke, and
the second groove is disposed on the outer side of another one of the plurality of teeth in the radial direction of the stator yoke.

7. The stator as in claim 1, wherein
the first groove is disposed on an outer side of the contact portion in a radial direction of the stator yoke.

8. The stator as in claim 1, wherein
the stator yoke comprises a plurality of contact parts, including the contact part, and
each of the contact parts is a part at which an end surface of one of the one or more yoke portions in the circumferential direction contacts an end surface of another one of the yoke portions in the circumferential direction.

9. An electric pump comprising:
a brushless motor that comprises:
    a stator; and
    a rotor stored inside of the stator, and rotatably supported on the stator; and
an impeller fixed to the rotor,
wherein
the stator comprises:
    a stator yoke having a cylindrical shape and including one or more yoke portions extending along a circumferential direction of the cylindrical shape;
    a plurality of teeth projecting radially inward from an inner circumferential surface of the stator yoke, and disposed with an interval between each other; and
    a cover configured of resin and covering inner circumferential surfaces of the plurality of teeth,
the stator yoke comprises:
    a contact part at which an end surface of one yoke portion among the one or more yoke portions in the circumferential direction contacts the other end surface of the one yoke portion in the circumferential direction, or at which the end surface of the one yoke portion contacts an end surface of another one of the one or more yoke portions in the circumferential direction;
    a first groove extending along an axial direction of the cylindrical shape on an outer circumferential surface of the stator yoke in a vicinity of the contact part; and
    a second groove extending along the axial direction on the outer circumferential surface and disposed at a position spaced farther away from the contact part than the first groove,
the cover comprises a filling that fills the first groove, and the second groove is hollow.

* * * * *